United States Patent
Koh et al.

(10) Patent No.: US 7,092,600 B2
(45) Date of Patent: Aug. 15, 2006

(54) METHOD FOR FABRICATING FIBER BRAGG GRATING ELEMENTS AND PLANAR LIGHT CIRCUITS MADE THEREOF

(75) Inventors: Chao-Ming Koh, Shuang-His Tsun (TW); Jia-Ching Doong, Kaohsiung (TW); Hsien-Tzu Chang, Judung Jen (TW); Hao-Cheng Hung, Jubei (TW)

(73) Assignee: Vanguard International Semiconductor Corporation, Hsinchu (TW)

( * ) Notice: Subject to any disclaimer, the term of this patent is extended or adjusted under 35 U.S.C. 154(b) by 0 days.

(21) Appl. No.: 11/134,264

(22) Filed: May 23, 2005

(65) Prior Publication Data

US 2005/0207701 A1 Sep. 22, 2005

Related U.S. Application Data

(62) Division of application No. 10/642,573, filed on Aug. 19, 2003, now Pat. No. 6,978,066.

(30) Foreign Application Priority Data

Apr. 29, 2003 (TW) ............................... 92109982 A

(51) Int. Cl.
*G02B 6/34* (2006.01)

(52) U.S. Cl. .............................. 385/37; 385/15; 385/31
(58) Field of Classification Search .................. 385/15, 385/31, 37
See application file for complete search history.

(56) References Cited

U.S. PATENT DOCUMENTS

| 4,906,063 A | 3/1990 | Sato et al. |
| 6,303,040 B1 | 10/2001 | Oh et al. |
| 6,522,812 B1 | 2/2003 | Nikonov |
| 6,879,756 B1 * | 4/2005 | Wakabayashi et al. ........ 385/37 |

* cited by examiner

*Primary Examiner*—Jennifer Doan
(74) *Attorney, Agent, or Firm*—Birch, Stewart, Kolasch & Birch, LLP

(57) ABSTRACT

A method for fabricating Fiber Bragg Grating elements and planar light circuits made thereof. A mask having a predetermined pattern and a wafer are provided, wherein a light-guiding channel filled with light-guiding substance is formed on the wafer. A photoresist layer is then formed to cover the wafer. Magnification of a photolithography apparatus is adjusted to a first Mag., followed by transferring the pattern on the mask to the photoresist layer to form a first pattern. Light-guiding substance not covered by the photoresist layer is then removed so that the first pattern is transferred to the light-guiding channel. The light-guiding channel then forms a Fiber Bragg Grating element.

3 Claims, 10 Drawing Sheets

METHOD FOR FABRICATING FIBER BRAGG GRATING ELEMENTS AND PLANAR LIGHT CIRCUITS MADE THEREOF

CROSS-REFERENCE TO RELATED APPLICATIONS

This application is a Divisional of application Ser. No. 10/642,573, filed on Aug. 19, 2003, now U.S. Pat. No. 6,978,066, the entire contents of which are hereby incorporated by reference and for which priority is claimed under 35 U.S.C. § 120.

BACKGROUND OF THE INVENTION

1. Field of the Invention

The present invention relates to a method for fabricating optical elements, and in particular to a method for fabricating Fiber Bragg Grating elements and planar light circuits made thereof.

2. Description of the Related Art

In long distance fiber optic communication systems, inactive elements, such as Fiber Bragg Grating (FBG), array waveguide grating (AWG) are critical high-end elements. FBG applications, for example, include optical add-drop multiplexers (OADM), Erbium doped fiber amplifiers (EDFA) and Raman amplifiers, all of which have recently become very popular.

Fiber Bragg Grating (FBG) is commonly manufactured by subjecting optical fiber to high energy UV excimer laser. When parts of the optical fiber are subject to a high energy laser treatment, the bonding state of the inner molecular structure changes, thereby increasing the refractive index. The refractive index of the optical fiber is changed by forming grating periods using masks. When a bandwidth is an integer times a light of specific wavelength, the light will be reflected and the rest of the light passes through the optical fiber. As a result, the incoming light either passes through or is reflected by the Fiber Bragg Grating. In terms of input and output, the FBG is an optical notch filter, corresponding to a specific bandwidth ($BW_n$), a notch frequency ($f_n$) and a notch wavelength ($\lambda_n$).

The fabrication of Fiber Bragg Grating (FBG) elements is carried out by controlling the laser energy and laser exposure time, and employing masks. FIG. 1 illustrates a traditional method for fabricating a Fiber Bragg Grating element. In FIG. 1, 10 represents optical fiber, 12 is a mask, 14 is a reflective mirror, and 16 is a KrF excimer laser beam with a 248 nm wavelength. The KrF laser beam penetrates the mask 12, passes through the reflective mirror 14, and hits the optical fiber 10. The inner molecular structure of the optical fiber 10 is thus changed to form interference stripes 20 of a specific reflective index. The grating period (pitch) 22 controls the reflective index when an incoming light passes through the optical fiber. Therefore, when light 8 passes through the optical fiber 10, 24a denotes the light corresponding to the interference stripes is selected as the reflective light 24. The remaining light, denoted as 26 in the figure, is then transmitted through the optical fiber.

Due to the restrictions of the current semiconductor manufacturing process, integration of Fiber Bragg Grating elements with semiconductor wafers does not always satisfy various design requirements. The reasons for this are further discussed in the following.

Current patterns on masks are defined by electron beams with a minimum width of e-beam of 50 angstroms. As a result, the minimum pitch of patterns on masks is 50 angstroms. When patterns are transferred onto wafers by photolithography apparatus, with a magnification of 5 for example, the minimum pitch (i.e. resolution) on a wafer is 10 angstroms. In other words, if a Fiber Bragg Grating 2000 angstroms in wavelength is to be fabricated, using the masks and magnification described above, the real wavelength must be 2000+n*10 angstroms. Consequently, an FBG of 2005 angstroms in wavelength cannot be fabricated by this method. Therefore, design freedom is restricted.

Hence, there is a need for a novel method for fabricating FBG without limitations on resolutions so that various design requirements can be obtained.

SUMMARY OF THE INVENTION

Accordingly, an object of the invention is to provide a method for fabricating Fiber Bragg Grating elements using photolithography techniques commonly used in the semiconductor industry. The correlation of pattern pitch, and the magnification of steppers are fine tuned so that patterns having predetermined grating periods are transferred to a wafer to form interference stripes that select specific wavelengths. The wafer having specific interference stripes then forms the Fiber Bragg Grating element.

The method for fabricating Fiber Bragg Grating elements, comprises the steps of: (a) providing a mask having a predetermined pattern and a wafer, wherein a light-guiding channel filled with light-guiding substance is formed on the wafer, and a photoresist layer is formed on the wafer; (b) adjusting the magnification of a photolithography apparatus to a first Mag. and transferring the pattern of the mask onto the photoresist layer to form a first pattern; and (c) removing the light-guiding substance not covered by the photoresist layer so that the first pattern is transferred to the light-guiding channel, thus the light-guiding channel forms a Fiber Bragg Grating element.

According to the method of the invention, the mask preferably contains a glass substrate, and the predetermined pattern on the mask is preferably made of Cr.

The method of the invention further comprises adjusting the magnification of the photolithography apparatus to a second Mag. so that the predetermined pattern is transferred to the photoresist layer to form a second pattern, wherein the second Mag. is not equal to the first Mag., and the first pattern and the second pattern are formed on the light-guiding channel without overlapping one another; wherein the first pattern and the second pattern are simultaneously transferred in step (c) to the light-guiding channel.

The method of the invention is also useful in fabricating a planar light circuit (PLC) on a wafer. The PLC comprises: a light-guiding channel, formed on the surface of the wafer; and a plurality of Fiber Bragg Grating elements formed in series on the light-guiding channel, and the Fiber Bragg Grating elements contain corresponding patterns similar to each other, but have different sizes.

In the planar light circuit mentioned above, the Fiber Bragg Grating optical elements correspond to a number of light wavelengths, wherein adjacent wavelength difference is less than 10 nm, or is less than a bandwidth of the Fiber Bragg Grating elements.

Moreover, the plurality Fiber Bragg Grating elements are combined as an equivalent Fiber Bragg Grating element, which comprises an equivalent notch wavelength and an equivalent bandwidth, wherein the equivalent bandwidth is greater than any bandwidth of the Fiber Bragg Grating elements.

According to the method for fabricating Fiber Bragg Grating optical elements of the invention, conventional problems of fabricating FBG of interpolation sizes is overcome by photolithography technique commonly used in the semiconductor industry. Predetermined patterns are transferred to wafers by finding suitable magnifications to meet design requirements. By doing so, predetermined patterns on masks can be transferred to wafers by any magnification. Not only is high accuracy achieved, but non-integer magnification is also achieved.

According to the planar light circuit of the invention, variation during the photolithography process is prevented by forming a plurality of Fiber Bragg Grating optical elements in series. When a single Fiber Bragg Grating optical element cannot accurately select a specific wavelength due to variation during the fabrication process, it can be overcome by effectively increasing the bandwidth of the Fiber Bragg Grating optical element to meet design requirements. In other words, the planar light circuit, formed by a plurality of Fiber Bragg Grating elements in series, exhibits enlarged bandwidth to accommodate potential variation during the fabrication process.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DETAILED DESCRIPTION OF THE INVENTION

EMBODIMENTS

1$^{st}$ Embodiment

Figure 7:
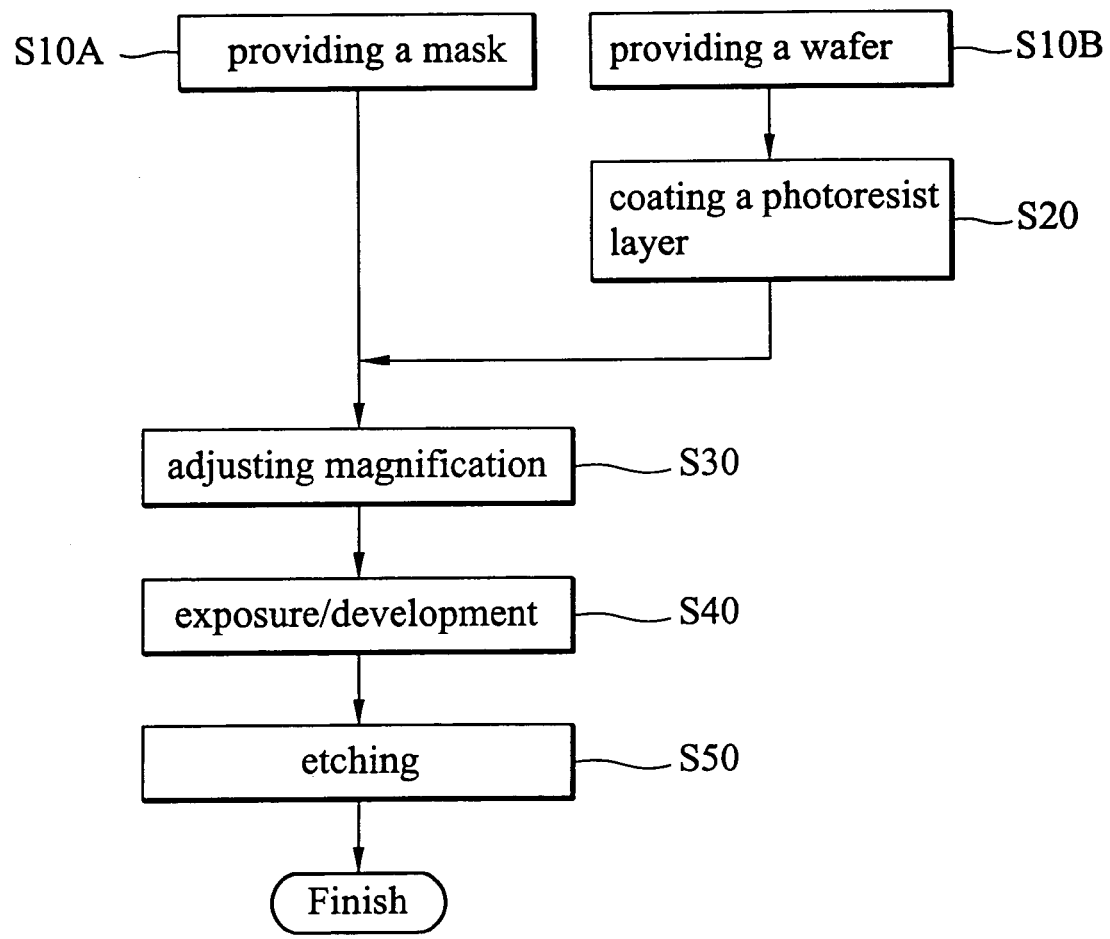
FIG. 7 is a flowchart according to the first embodiment of the invention.

FIG. 7 illustrates the flowchart according to the first embodiment of the invention.

Figure 1:
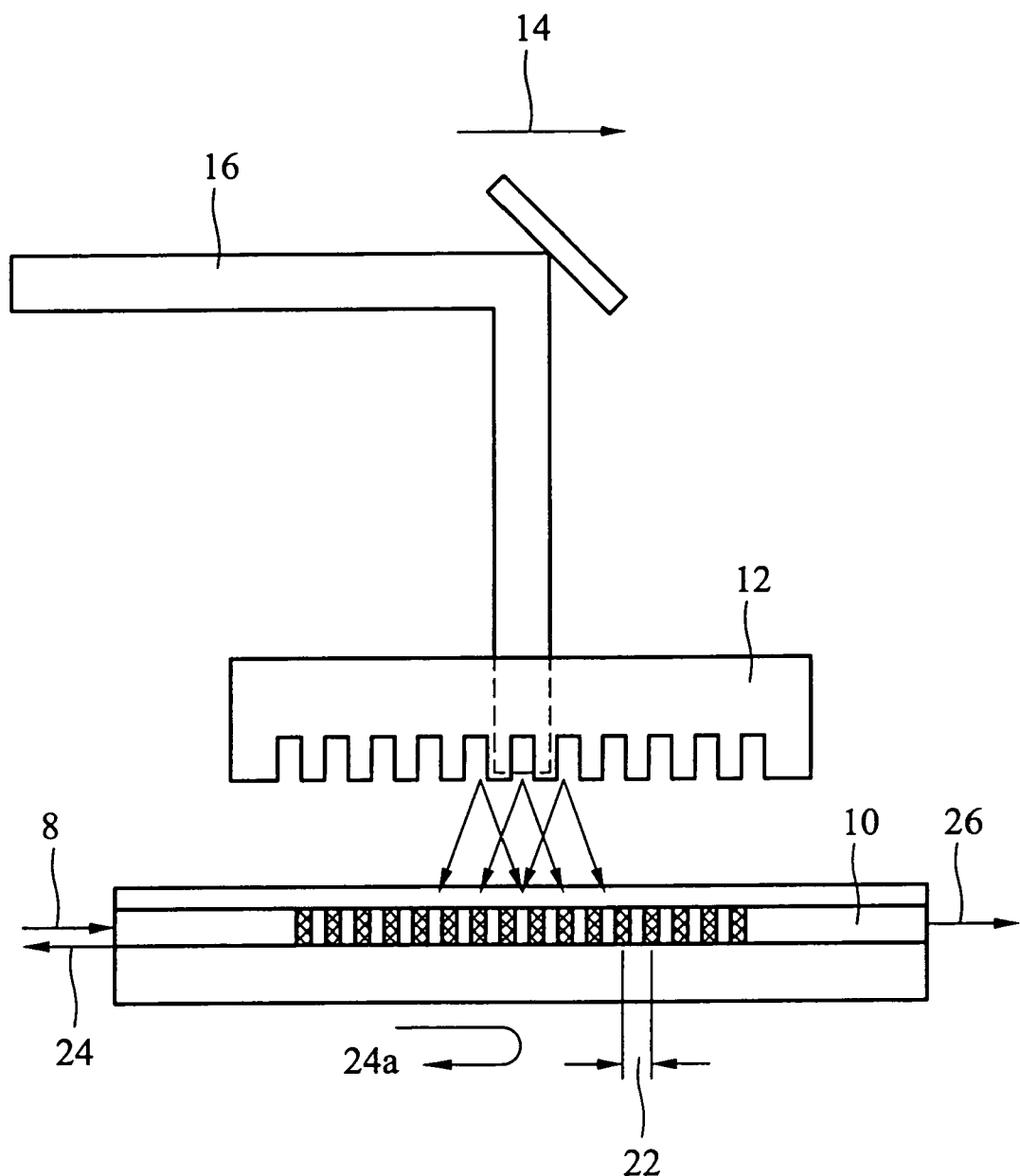
FIG. 1 is a cross section of a conventional method of fabricating Fiber Bragg Grating elements.
Figure 2A:
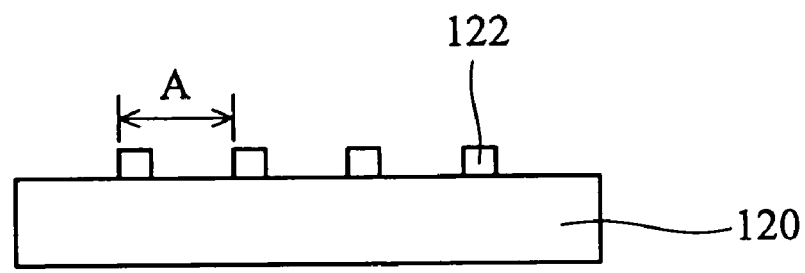
FIGS. 2A and 2B are schematic views and cross sections showing the fabrication of the first embodiment.
Figure 2B:
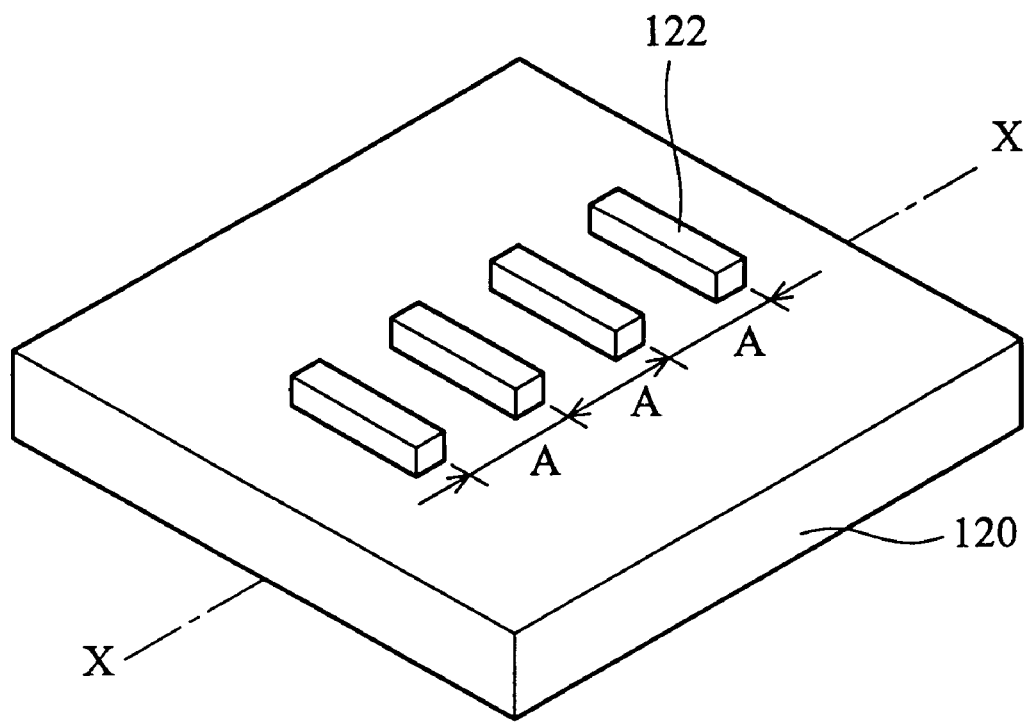

First, in step S10A, a mask 120, as shown in FIGS. 2A and 2B is provided. A pattern 122 formed with a predetermined pitch A is formed on the mask. The mask 120 is preferably formed on a glass substrate. The pattern 122 is preferably formed by Tin.

Figure 3:
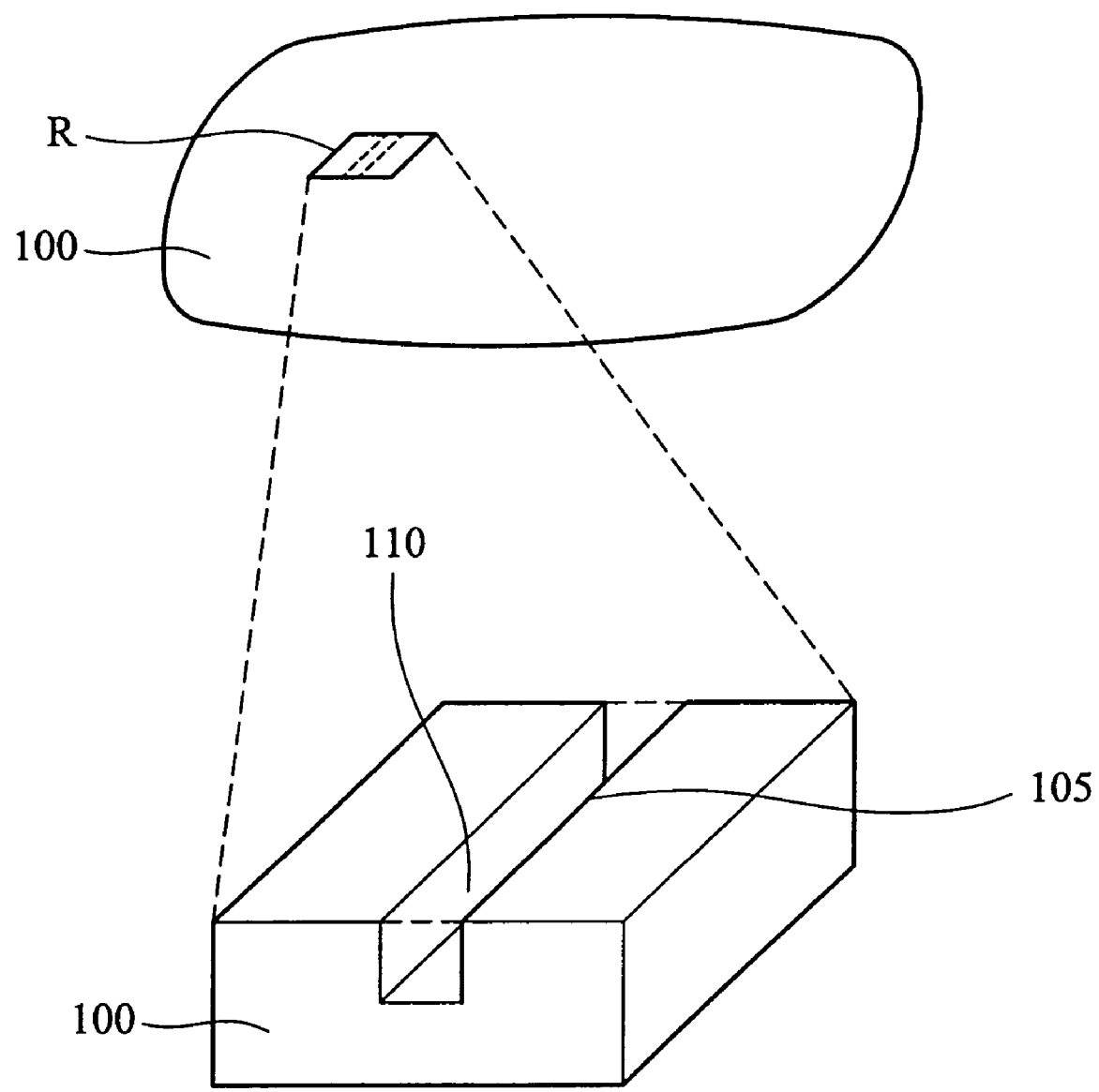
FIG. 3 illustrates the position of the Fiber Bragg Grating element relative to the wafer according to the first embodiment of the invention.
Figure 4A:
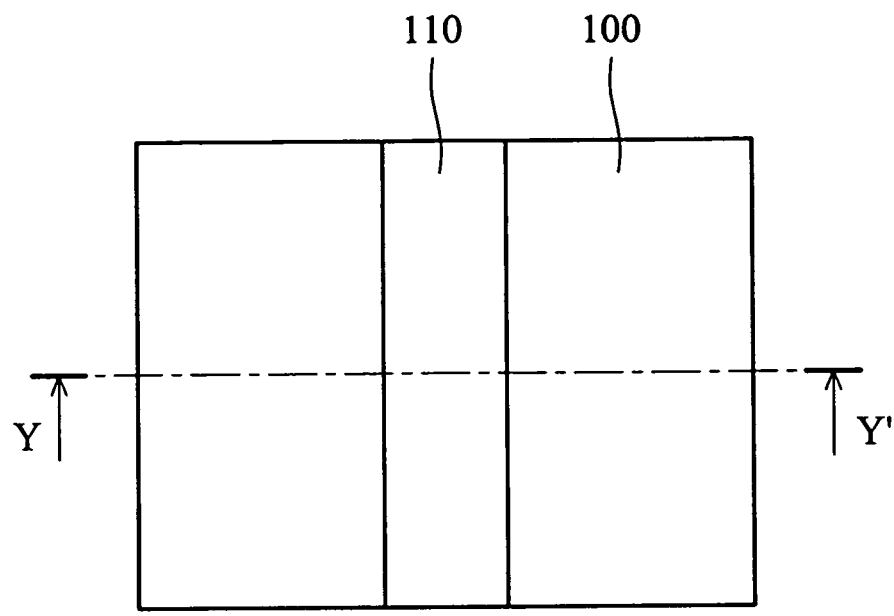
FIGS. 4A and 4B illustrate top views and cross sections of the fabrication process according to the first embodiment of the invention.
Figure 4B:
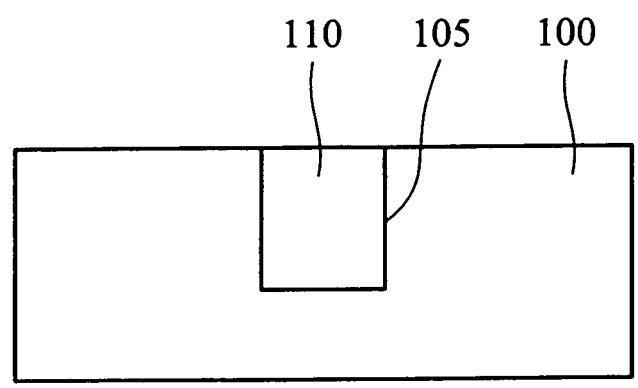

Meanwhile, in step S10 B, a wafer 100, shown in FIG. 3 is provided, wherein an area R indicates the position where the Fiber Bragg Grating element is to be formed. The area R comprises a light-guiding channel 105, filled with light-guiding substance 110. In order to more clearly illustrate the area R, FIGS. 4A and 4B illustrate the top view and cross sections of the area R. FIG. 4B is the cross section of FIG. 4A along the line Y–Y'. For example, wafer 100 is silicon. The light-guiding channel 105 is a trench formed by SiN, wherein the light-guiding substance 110 is SiO.

Next, photoresist is coated onto the area R to form a photoresist layer 140 by a coating machine in step S20.

Then, the magnification of a photolithography apparatus is adjusted to a predetermined first Mag in step S30, which is the critical step of the invention where magnification is adjusted to meet various design requirements. In conventional methods, magnification is usually 4 or 5, which means the patterns on the mask, transferred to the wafer, are reduced to ¼ or ⅕. In other words, magnification of the photolithography apparatus of semiconductor process is fixed, and cannot be changed when adopting conventional methods. As a result, photoresist layers on wafers are continuously exposed and developed one by one without changing magnifications due to stability concerns in the conventional semiconductor manufacturing process. In order to solve this fixed magnification problem, the invention features active modification of the magnification of the photolithography apparatus, in order to meet various design requirements. Consequently, magnification can either be 5 (integer) or with decimals, such as 5.02.

Figure 5A:
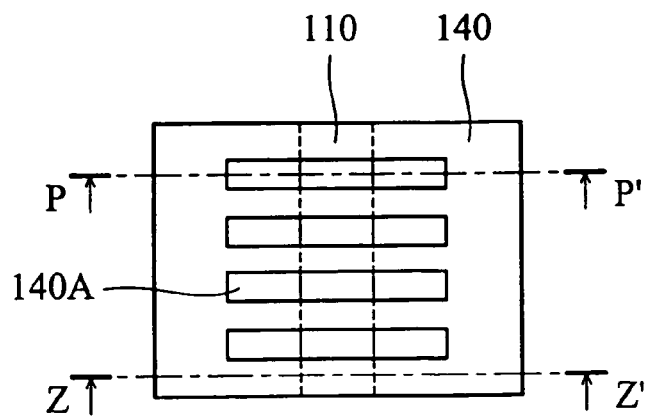
FIGS. 5A, 5B and 5C are top views and cross sections of the fabrication process according to the first embodiment of the invention.
Figure 5B:
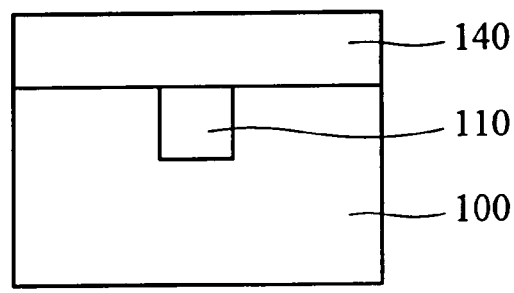
Figure 5C:
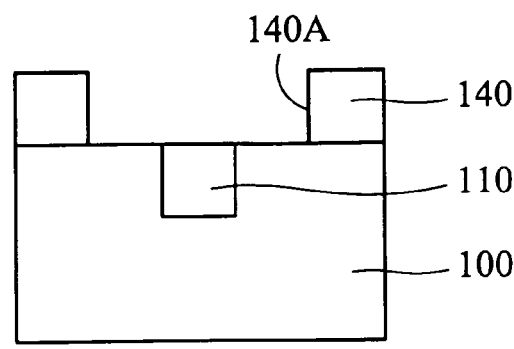

Next, in step S40, exposure/development using the predetermined magnification is carried out to transfer the pattern 122 to the photoresist layer 140 to form a first pattern, as shown in FIGS. 5A~5C. FIG. 5A illustrates the top view of the photoresist layer after exposure. FIGS. 5B and 5C illustrate the cross sections of FIG. 5A. Numbers 140 and 140A represents the photoresist layer and the area not covered by the photoresist layer respectively. FIG. 5B illustrates the cross section of FIG. 5A along the line Z–Z'. FIG. 5C illustrates the cross section of FIG. 5A along the line P–P'. The first pattern is positioned exactly on the light-guiding channel. Due to the above magnification, pitch of the pattern is reduced to A'. In this embodiment, a deep ultra violet (DUV) stepper is applied. Other steppers, such as I-line or G-line are also applicable.

Figure 6A:
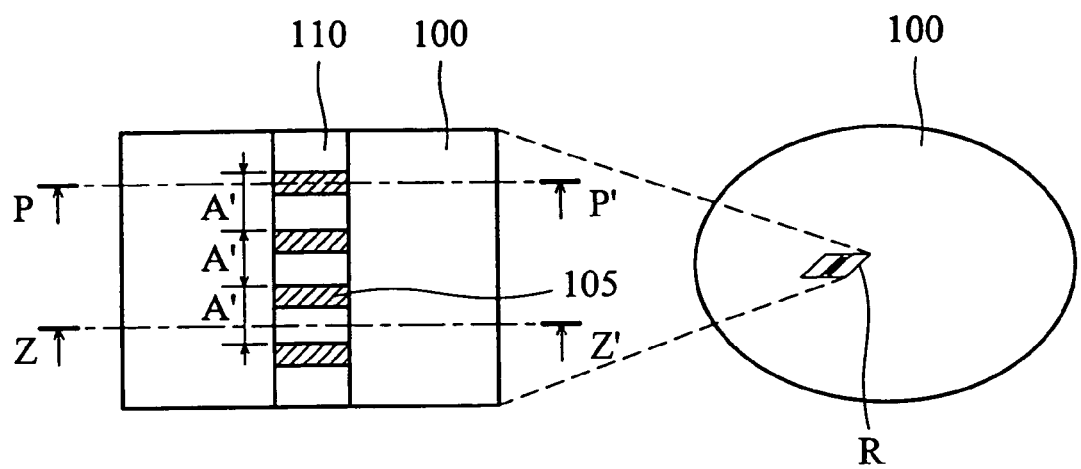
FIGS. 6A, 6B and 6C are top views and cross sections of the fabrication process according to the first embodiment of the invention.
Figure 6B:
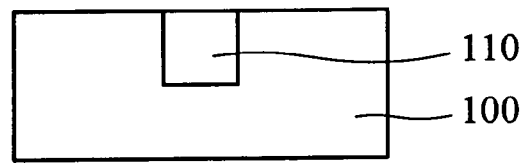
Figure 6C:
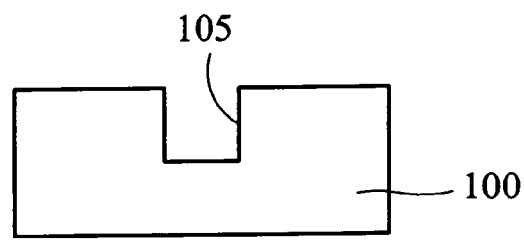

Then, etching in step S50 is performed to remove the light-guiding substance not covered by the photoresist layer 140. The pattern of the photoresist layer 140 is then transferred to the light-guiding channel on the wafer. The light-guiding channel then comprises a pattern formed by the light-guiding substance 110 and the trench 105. In FIG. 6A, the relative position of the area R to the wafer 100 is illustrated. FIGS. 6B and 6C illustrate the cross sections along the lines P–P' and Z–Z' respectively in FIG. 6A. 110 represents the part filled with light-guiding substance and 105 represent the exposed trench. It is observed from the figures that the light-guiding channel exhibit a pattern formed by light-guiding substance arranged periodically with a pitch A'. A Fiber Bragg Grating optical element is then formed to filter/select a light in wavelength A' from the light entering the light-guiding channel.

The following formula explains the relationship of pitch A on the mask and the pitch A' on the wafer.

$$A=NS=M*A'$$

$$A'=NS/M$$

Wherein N is an integer, S is the highest resolution of the mask and M is the adjustable magnification.

For example, A' is 2005 Å when a Fiber Bragg Grating element $\lambda_n$=2005 Å in wavelength is to be fabricated. M is preferably the magnification closest to the common magnification of a semiconductor process to avoid excess adjustment and maintain stability. Therefore, M is set to be 5. S is restricted and fixed by the electron beam of the mask-producing apparatus. In this embodiment, S is 50 Å. Under this condition, the closest number N is 200 (or 201). Consequently, M is adjusted to 4.9875 (or 5.0124). Pitch A on the mask equals 200*50=10000 Å (or 201*50=100500) to obtain a pitch A' of 2005 on the wafer. A Fiber Bragg Grating optical element $\lambda_n$=2005 in wavelength is thus obtained.

The Magnification of the photolithography apparatus is adjusted in many ways, the easiest way is to adjust the distance between the wafer stage holding the wafer and the lens of the photolithography apparatus. Fine tuning of the magnification is done by small adjustments to the height of the wafer stage. However, it should be noted that depth of focus must be maintained without losing focus, or patterns may not be transferred on the photoresist layer. The mirror or mask can also be adjusted to modify the magnifications.

In comparison to the conventional method that cannot fabricate Fiber Bragg Grating elements meeting various design requirements, the invention features a method for fine tuning the magnification of a photolithography apparatus so that Fiber Bragg Grating elements having the required $\lambda_n$ are fabricated.

2$^{nd}$ Embodiment

This embodiment is an application of the 1$^{st}$ embodiment. A plurality of Fiber Bragg Grating elements fabricated in the 1$^{st}$ embodiment are formed in series, thereby enhancing accuracy and avoiding possible variations during the fabrication process.

Figure 9:
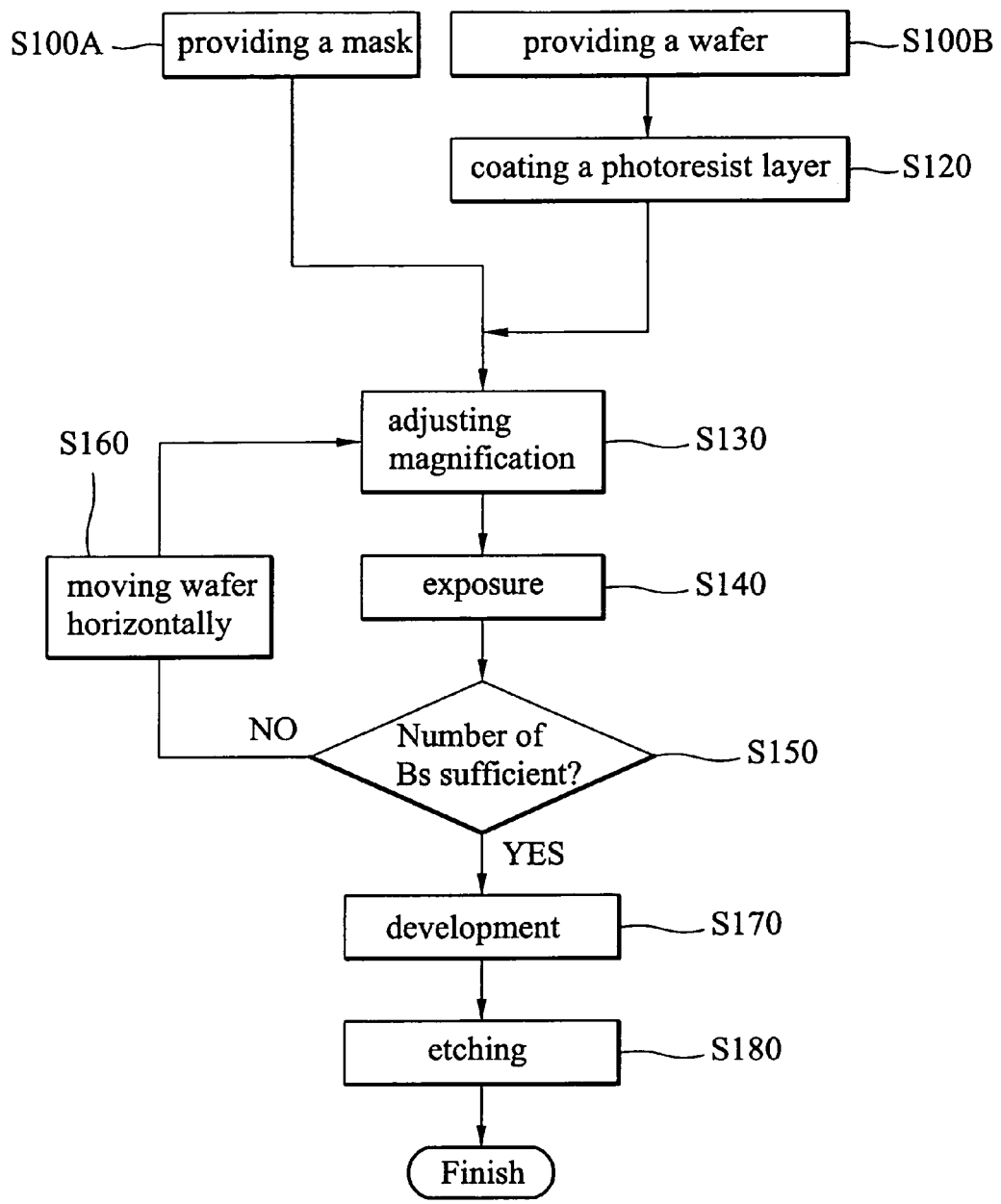
FIG. 9 is a flowchart according to the second embodiment of the invention.

FIG. 9 is a flowchart illustrating the process of the 2$^{nd}$ embodiment of the invention. A mask and wafer are provided in step S100A and S100B. A photoresist layer is then formed on the wafer (step S120).

Next, magnification of the photolithography apparatus is adjusted to a first Mag. (step S130). First exposure is performed to the photoresist layer 140 (step S140) without development. Then, if the number of Fiber Bragg Grating elements is insufficient (step 150), the wafer is moved horizontally (step S160), and magnification of the photolithography apparatus is adjusted to a second Mag. (not equal to the first Mag.). A second exposure is then carried out to the photoresist layer 140. Patterns formed by two exposures are then formed on the light-guiding channel, without overlapping one another. In other words, multiple exposures are performed using different magnifications to transfer the same mask pattern to the photoresist layer on the light-guiding channel. The number of exposures depends on the number of Fiber Bragg Grating elements required.

Next, development is performed in step S170 to form a plurality of similar patterns but have different sizes, on the photoresist layer 140.

Figure 8A:
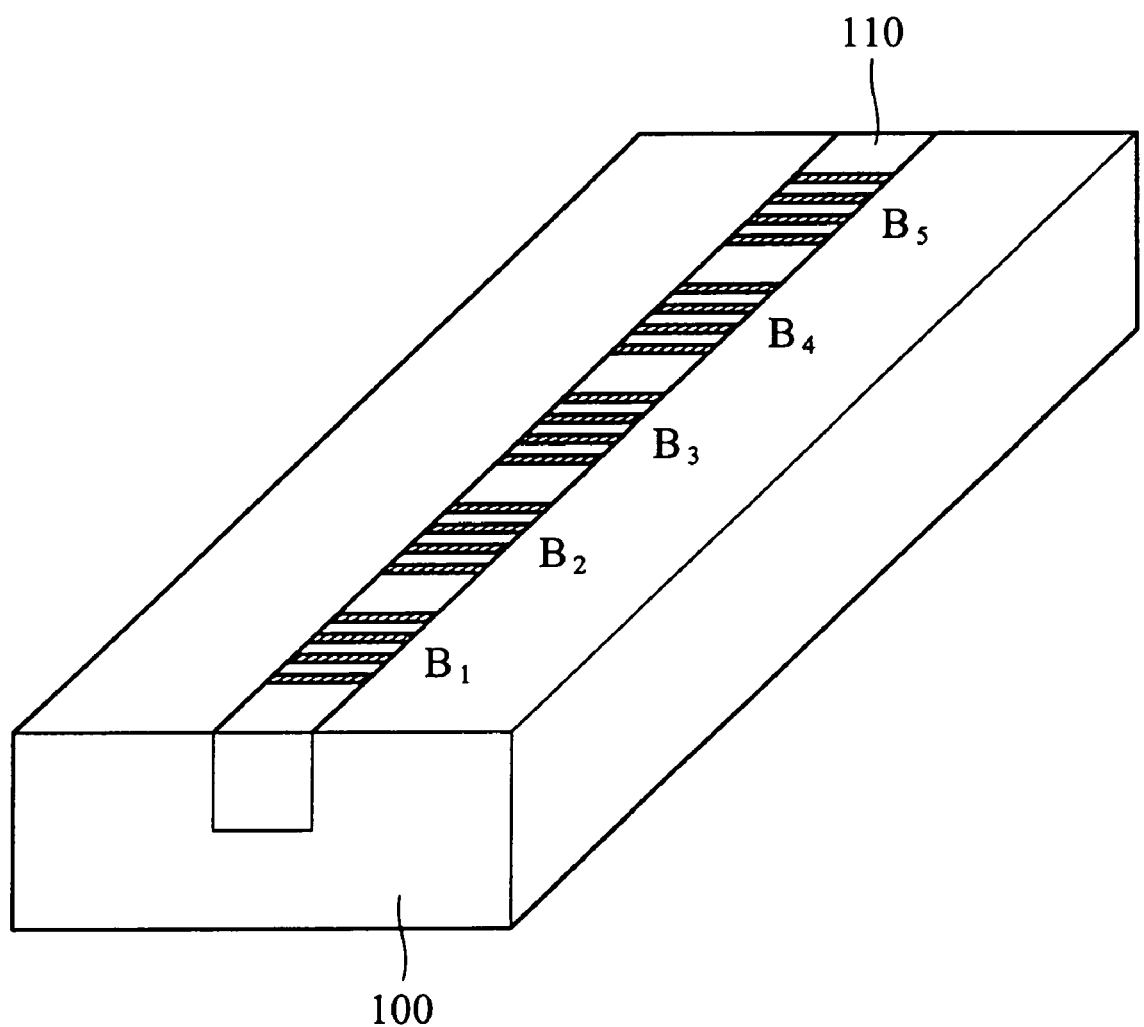
FIG. 8A is a schematic view of the planar light circuit fabricated in the second embodiment of the invention.

Etching is then carried out in step S180 to remove the light-guiding substances not covered by the photoresist layer 140, thus transferring the patterns on the photoresist layer onto the light-guiding channel. Every single pattern correlates to a Fiber Bragg Grating element. Therefore, a plurality of Fiber Bragg Grating elements, numbered B1~B5, are formed in series in the light-guiding channel 110 on the wafer 100, as shown in FIG. 8A. Since different magnifications are used, Fiber Bragg Grating elements, having similar patterns of different sizes, exhibit different $\lambda_n$.

The advantage associated with the Fiber Bragg Grating optical elements formed in series is prevention of variation during the photolithography process, where a single Fiber Bragg Grating element cannot accurately select light of a certain wavelength.

Figure 8B:
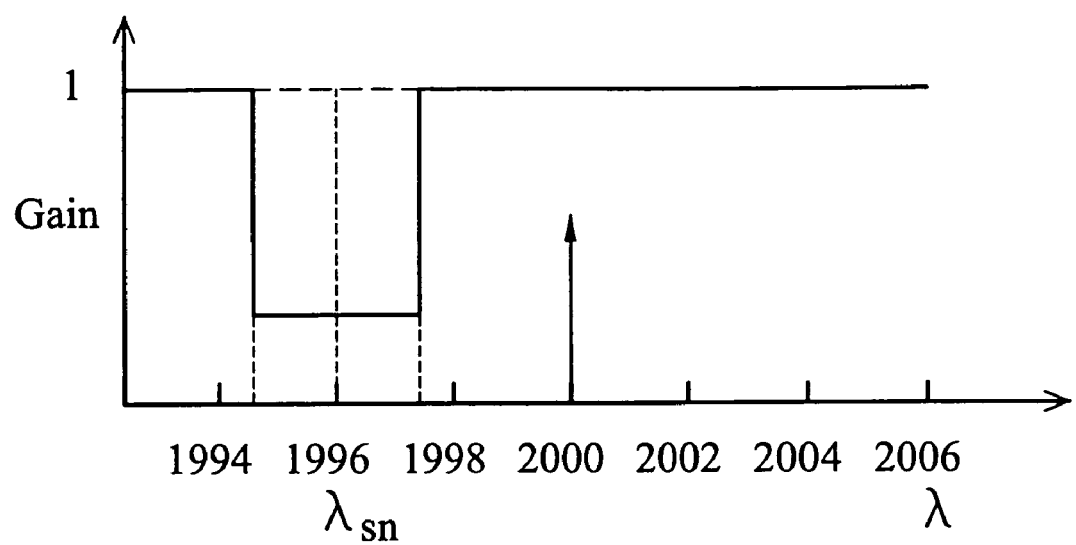
FIG. 8B is a graph showing the relation of the gain vs. wavelength according to a conventional Fiber Bragg Grating element.

It is assumed that variation during the process allows for 0.2% inaccuracy. Bandwidth (BW$_n$) for every single Fiber Bragg Grating element is only 2 Å. This means a Fiber Bragg Grating element designed to select a light 2000 Å in wavelength, the actual $\lambda_n$ of the Fiber Bragg Grating element is 1996~2004, calculated by 2000*(1±2%). If a Fiber Bragg Grating element $\lambda_n$=1996 Å in wavelength is actually fabricated, FIG. 8B illustrates the relationship of Gain vs. $\lambda_n$. It is observed that the selected light is from 1995 (=$\lambda_n$−BW$_n$/2) to 1997 (=$\lambda_n$+BW$_n$/2) in wavelength. In this case, the light of 2000 Å in wavelength is not within the range, hence cannot be accurately selected.

In this 2$^{nd}$ embodiment, five Fiber Bragg Grating elements in series (B1, B2, B3, B4 and B5) having expected $\lambda_n$ of 1996, 1998, 2000, 2002 and 2004 Å are fabricated. Since the $\lambda_n$ difference of adjacent Fiber Bragg Grating elements is less than the BW$_n$ of a single Fiber Bragg Grating element, B1~B5 is then viewed as a equivalent Fiber Bragg Grating element (Bs).

Figure 8C:
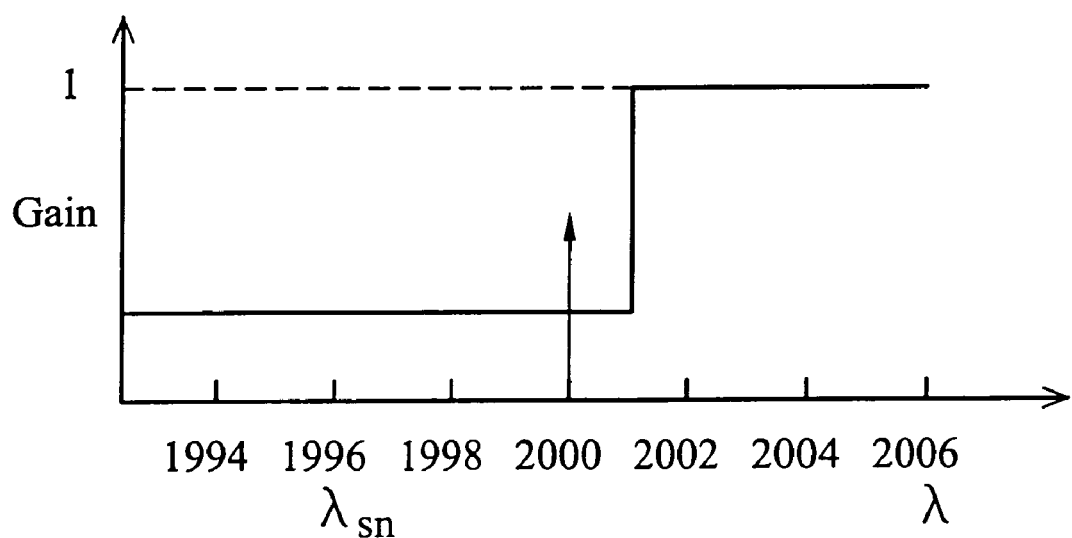
FIG. 8C is a schematic view of the planar light circuit fabricated in the second embodiment of the invention.

Expected $\lambda_{sn}$ is 2000 Å and BW$_{sn}$ is 10 (2*5) Å. As a result, even if variations do occur, $\lambda_n$ is still in between 1996 and 2004 Å for Bs. FIG. 8C illustrates the relationship of Gain vs. $\lambda_n$ according to the 2$^{nd}$ embodiment of the invention. If the worst condition occurs, the actual $\lambda_{sn}$ of Bs is 1996 Å, allowing Bs to select the light between 1991 Å (=$\lambda_{sn}$−BW$_{sn}$/2) and 2001 Å (=$\lambda_{sn}$+BW$_{sn}$2) in wavelength. The expected wavelength of 2000 Å is thus successfully filtered by Bs. In other words, even if the worst condition occurs, the equivalent Fiber Bragg Grating element fabricated by the method provided in this invention still selects light of the required wavelength (2000 Å). In FIG. 8C, a wavelength of 2000 Å still falls in the range of selected wavelength. Consequently, variations during the process are overcome.

In other words, an equivalent Fiber Bragg Grating element, formed by a plurality of Fiber Bragg Grating elements in series, effectively increases the bandwidth so that variation during the process is eliminated. Design requirements are thus satisfied.

The equivalent Fiber Bragg Grating element should be designed carefully to avoid filtering out the light that should not have been selected. For example, if the selected light exhibits a wavelength of 2000 Å, and the light not to be filtered is 1990 Å. It is assumed that variation of $\lambda_n$ during process is Δλ. Therefore, considering the worst situation where $\lambda_{sn}$ is 2000−(Δλ), the shortest wavelength filtered is $(2000-(\Delta\lambda)-BW_{sn}/2)$Å. This value must be greater than 1990. By doing so, filtering light of 1990 Å can be avoided.

The equivalent Fiber Bragg Grating element (Bs) fabricated in the $2^{nd}$ embodiment is an optical notch filter correlated to a certain bandwidth ($BW_n$), a notch frequency ($f_n$) and a corresponding notch wavelength ($\lambda_n$). As shown in is FIG. 8A, the Fiber Bragg Grating elements B1~B5 formed in series are in the light-guiding channel 110 on the wafer 100. Because of different magnifications for each exposure, every single Fiber Bragg Grating element is different from the others in size but have similar patterns. As a result, different wavelengths $\lambda_n$ for every single Fiber Bragg Grating element is fabricated. By fabricating a series of Fiber Bragg Grating elements to form an equivalent Fiber Bragg Grating element, one equivalent notch wavelength and one equivalent bandwidth are obtained. By doing so, the equivalent bandwidth of an equivalent Fiber Bragg Grating element is greater than that of any Fiber Bragg Grating element.

According to the method provided in this invention, patterns on a mask can be transferred to wafers by any magnification, either integers or non-integers, by fine tuning of the photolithography apparatus. Consequently, a wide variety of design requirements can be satisfied. Fiber Bragg Grating elements fabricated thereof exhibit high accuracy. In addition, variation during process is overcome by fabricating a number of Fiber Bragg Grating elements in series so that bandwidth is effectively enlarged to ensure filtering out of the required wavelength.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A planar light circuit, formed on a wafer, comprising:
   a light-guiding channel, formed on the surface of the wafer; and
   a plurality of Fiber Bragg Grating elements formed in series in the light-guiding channel, and the Fiber Bragg Grating elements contain corresponding patterns similar to each other, but different in sizes, comprising an equivalent notch wavelength and an equivalent bandwidth, wherein the equivalent bandwidth is greater than any one bandwidth of the Fiber Bragg Grating elements.

2. The planar light circuit as claimed in claim 1, wherein the Fiber Bragg Grating elements corresponds to lights of a plurality of wavelengths, and the difference between one wavelength and adjacent wavelength is less than 10 nm.

3. The planar light circuit as claimed in claim 1, wherein the Fiber Bragg Grating elements correspond to lights of a plurality of wavelengths, and the difference between one wavelength and adjacent wavelength is less than the one of the bandwidths of the Fiber Bragg Grating elements.

* * * * *